United States Patent [19]

Cobbe

[11] Patent Number: 5,131,631
[45] Date of Patent: Jul. 21, 1992

[54] PORTABLE PITLESS LIVESTOCK GATE

[76] Inventor: James A. Cobbe, Box 159, Limerick, Saskatchewan, Canada, S0H 2P0

[21] Appl. No.: 709,348

[22] Filed: Jun. 3, 1991

[51] Int. Cl.5 .................................................. A01K 3/00
[52] U.S. Cl. ........................................ 256/17; 256/14; 49/58; 49/131
[58] Field of Search ...................... 256/17, 14, 15, 16, 256/18; 49/134, 133, 132, 131, 58

[56] References Cited

U.S. PATENT DOCUMENTS

| | | | |
|---|---|---|---|
| 3,491,482 | 1/1970 | Wedekind | 49/131 |
| 3,516,202 | 6/1970 | Justic | 49/131 |
| 3,623,867 | 11/1971 | Williams | 49/132 X |
| 3,719,004 | 3/1973 | Shivers | 49/131 |
| 3,744,185 | 7/1973 | Patterson | 49/131 |
| 4,844,423 | 7/1989 | Combs | 256/14 X |

FOREIGN PATENT DOCUMENTS 764528 12/1956 United Kingdom ................ 49/131

Primary Examiner—Andrew V. Kundrat

[57] ABSTRACT

A portable pitless livestock barrier whereby vehicles or humans may easily gain access to a livestock enclosure but provides a deterrent to the unwanted passage of the livestock from such enclosure. The barrier is provided by having a horizontal main frame to be placed on the ground with a vertical frame supported and attached to each side of the main frame. Within the boundaries of the main frame are two platform grates that are connected to the main frame at the exit and entrance to the barrier but can be adjustably raised in the central area of the barrier by a spring biased lever lifting mechanism attached to each vertical frame which allows the platform grates to be forced to the ground when a vehicle passes over but when the vehicle has passed the grates regain their inclined position giving a perception of depth or poor footing to the livestock thereby providing a deterrent to their passage.

14 Claims, 2 Drawing Sheets

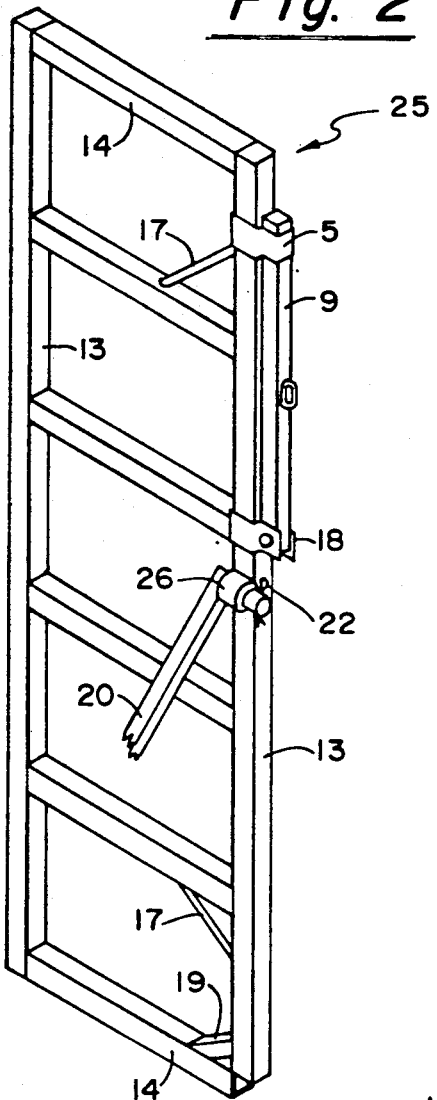
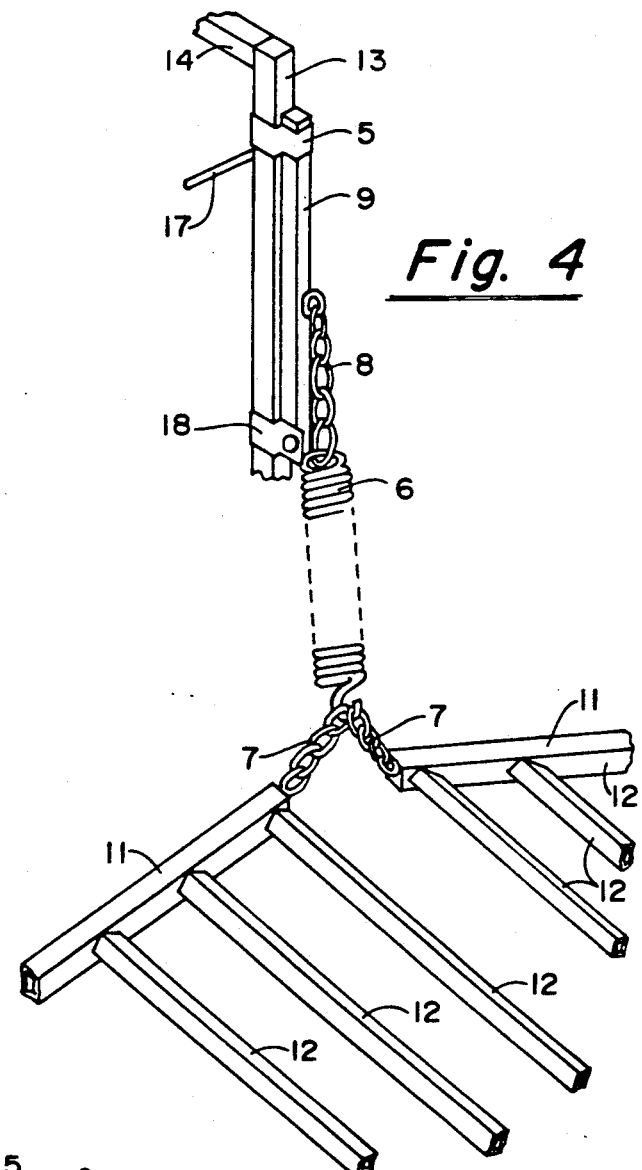

PORTABLE PITLESS LIVESTOCK GATE

This application relates to livestock gates and in particular to a portable gate most commonly used for cattle and often called a "Texas Gate".

BACKGROUND OF INVENTION

The control of livestock has always been a problem. With the disappearence of the herdsman and the desire to leave the livestock unattended it brought about fences and with the fences gates. Gates have always been a problem since they are often left open and it is irritating to the driver of a vehicle to have to stop and open a gate then drive through and stop again to close it. What was needed was a gate where one could drive through and it would still be an effective closure.

Efforts were made to carry out such a desired function without a barrier. Some of the prior art devices had grates requiring a "pit" to be dug beneath the grating to give the impression of insecure footing to the livestock, others had poles to be used as the grating, others are found in U.S. Pat. No. 2,539,214 and Canadian Patent 83,121. In the U.S. Pat. No. "214" there is shown straps spring mounted in a frame that can be depressed to the ground for the passage of persons or a vehicle but is a deterrent to the passage of cattle. Applicants device differs considerably from the above in that there are two solid gratings that are spring mounted by common springs to adjust for a desired angle of incline at the center or can in fact be disconnected and pivoted for complete blockage of a passageway. In the Canadian Patent "121", there is shown a cattle guard to prevent cattle from straying off a railway crossing on to the railway track. It consists essentially of a platform and casings that when tread upon actuate a whipping device to deter the passage of cattle. This device bears no resemblance to applicants device since as pointed out heretofore there is provided a pivoted grate that is adjustably spring biased, that can easily be traversed by a vehicle or person but gives the impression of insecure footing to the cattle and therefore is an excellent deterrent to passage.

It is readily discernible that the above two prior art patents neither singley nor combined teach anything that remotely resembles applicants portable livestock gate.

SUMMARY OF INVENTION

The present invention has been developed in order to quickly and easily gain access to a livestock enclosure by vehicles or humans yet provide a deterrent to the unwanted passage of the livestock from such enclosure.

Applicants device has two rigid grates that are moveably supported in a horizontal frame. On each side of the frame is mounted a vertical ladder frame which carries a lever actuated spring tethered by a chain to each grate whereby actuation of the levers inclines each grate so that the greatest height is in the central portion of the passageway with the entrance and exit being at ground level. The inclined or raised grating gives livestock the impression of insecure footing and is therefore a deterrent to their passage. The portability of applicants device is enhanced by telescopic joints and the use of tubular material.

In view of the above it is therefore an important object of the present invention to provide an enclosure that is readily accessible by vehicles including snowmobiles or humans by a gateway that is a formidable deterrent to the passage of livestock.

It is another object of the present invention to provide a gateway whose passage incline is spring biased upwardly in the central portion and is easily and quickly adjustable in height.

It is another object of the present invention to provide a light weight, strong and easily assembled gateway.

It is still a further object of the instant invention to provide a gateway that is portable and can be secured to an existing fence by means of the ladder uprights.

It is yet a further object of the present invention whereby the grates can be easily folded up to provide a positive barrier, converted to a swing gate or removed for snow removal.

Other objects and a fuller understanding of the invention may be had by referring to the following description and claims taken in conjunction with the accompanying drawings wherein like numerals will designate like elements throughout the several views.

BRIEF DESCRIPTION OF THE DRAWINGS

FIG. 2 is an enlarged isometric view of one of the vertical frames.

FIG. 3 is an enlarged isometric view of a left corner assembly of the main frame and platform grate.

FIG. 4 is an enlarged isometric of the platform grate tilting assembly.

Referring now to FIG. 1 we have two platform grates 1 which are basically rectangular in shape and are constructed preferably of square tubing. The platform grates 1 have two side members 11 separated and integrally united by cross members 12. These cross members 12 are located such that the apex of the square tubing is approximately in the top plane of the platform grate 1 as more clearly shown in FIGS. 3 and 4. The platform grate 1 has the cross members 12 stabilized by one or more straps 16 being welded thereto. These straps 16 could be replaced by several small pieces welded between each of the cross members 12. The platform grates 1 are attached to the main frame 24 near ends 3 of the main frame which normally rests on the ground. The main frame 24 has two main frame side members 2 separated and connected by two end members 3 and a cross member 4 in the central area. Telescopically connected to each side member 2 is a vertical ladder type frame 25 having side member uprights 13, cross members 14, brace 19 and platform grate securing rods 17. The top securing rod 17 is used on both vertical frames to secure a platform grate 1 by chains 10 that have been disconnected from the corners of the main frame 24 and the platform grate 1 pivoted to a vertical positive barrier location by hand. One or both platform grates 1 may with a chain 10 and a chain 7 disconnected on one side be pivoted up to a non barrier vertical position. Each chain may have a snap 23 at one or both ends thereof as shown in FIG. 3 for rapid assembly or disassembly. Each vertical frame is maintained in the vertical position by two vertical frame supports 20 each of which are connected to the main frame 24 and vertical frame 25 by slidably engaging a bushing 26 and retained by a retainer clip 22 which are used throughout the apparatus to ensure ease of assembly or disassembly. Two lifting lever assemblies to tilt the platform grates 1 by raising them in the central area include a lifting lever 9 pivotally attached by a support 18 to a vertical frame upright 13 and held in the operative position by a lifting lever retainer 5. Each lifting lever 9 is connected to platform grates 1 by an upper chain 8, lifting spring 6 and two lower chains 7. As mentioned previously all these chains can have easily connectable chain snaps 23 and can, of course, be any type of tethering means such as a rope or cable.

FIG. 2 is an enlarged isometric view of vertical frame 25 with its frame uprights 13 and frame cross members 14. The grate securing rods 17 are welded to an upright 13 and a cross member 14 to be engaged by a platform grate chain if needed or desired to hold the platform grates in a vertical position. The grate lifting lever 9 is shown in the operative position, held there by a sliding retainer 5 and pivotable about a lifting lever pivot 18. A vertical frame support 20 is shown slidably inserted into a vertical frame support bushing 26 and held by retainer clip 22. An identical support bushing 26 is mounted on the main frame side member 2 to be engaged by the other end of frame support 20.

FIG. 3 is an enlarged isometric view of the lower left corner of the frame 24 in FIG. 1, plus the relationship between the frame 24 with its cross member 4 and with the vertical frame 25. There is shown firstly how a protrusion or stud 15 on the main frame 24 in slidably engaged by a cross member 14 of the vertical frame 25 and how the main frame cross member 4 slidably engages a further protrusion 4' on the main frame 24. This type of telescoping assembly has been applied to both sides of the main frame 24. The main frame end members 3 have a protrusion 27 that is slidably received in the main frame side members 2. The protrusion 27 is then fastened by an eye pin 21 which is held in position by a retainer clip 22. The platform grates 1 are fastened at their outer corners to eye pins 21 by a chain 10 with quick release chain snap 23.

Figure 1:
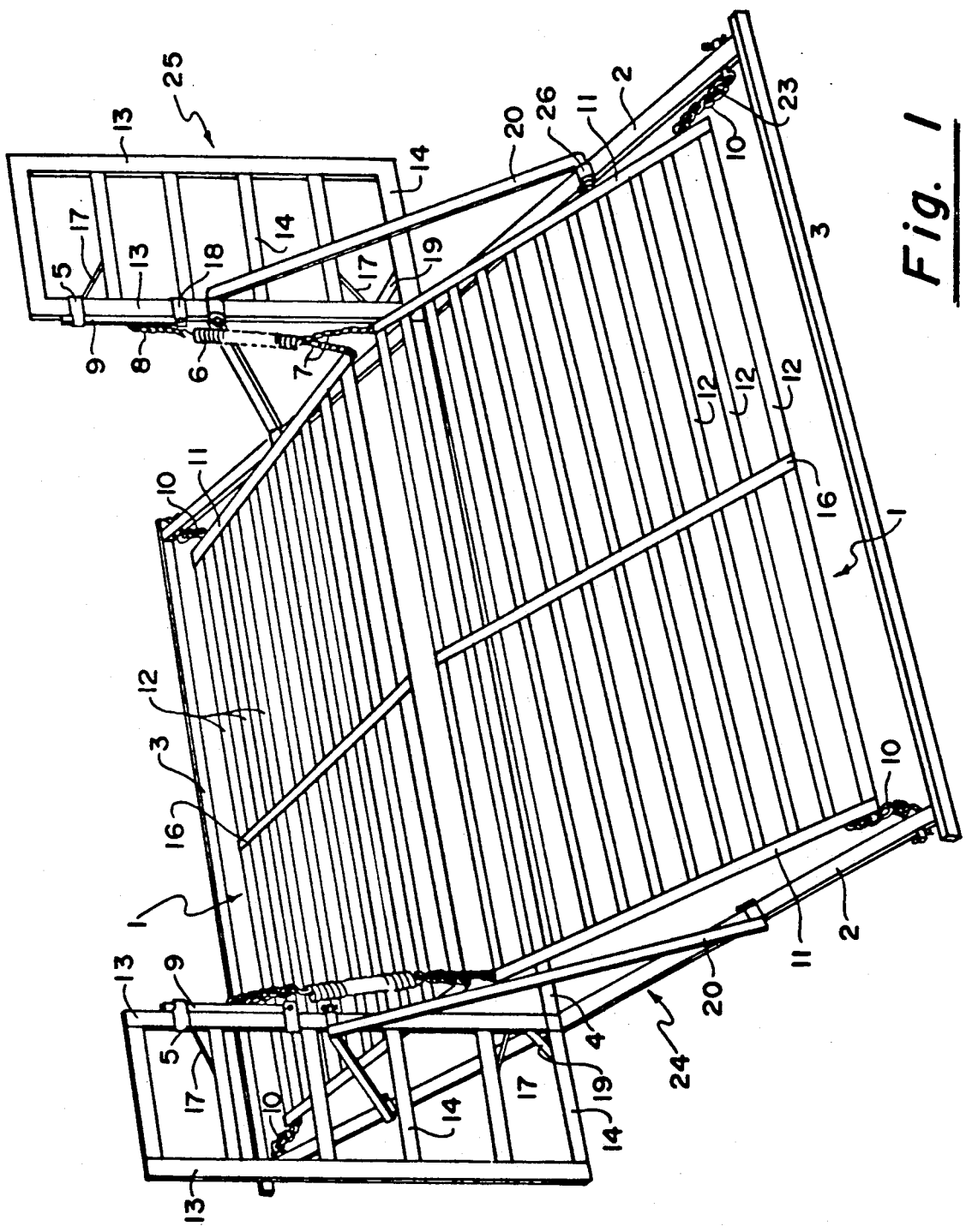
FIG. 1 is a schematic perspective view of the assembled gateway.

Now referring to FIG. 4 we have in enlarged isometric the platform grate lifting device which by lifting the platform grates 1 in the central area of the gate provide an entrance and exit incline which is a definite deterrent to livestock passage. There is shown a platform grate lifting lever 9 pivotable about a lifting lever pivot 18 fixed to vertical frame upright 13 and held in operative position by a lifting lever sliding retainer 5. Connected to the grate lifting lever 9 is a lifting spring upper chain 8 which is further connected to the grate lifting spring 6 which is in turn connected to a central corner of each grate by a lifting spring lower chain 7. Adjustment to the height of lift can easily be made by hooking the ends of the grate lifting spring 6 in alternate links.

Operation

To use applicants portable pitless livestock gate one need only provide an opening in a fence be it wire, boards or the like, and quickly assemble the gate with no tools required in a matter of minutes. The fence is then connected to the vertical frames 25. To assemble the gate the main frame side members 2 are laid on the ground parallel and spaced apart. The main frame cross member 4 is now made to telescopically receive main frame protrusions 4'. The main frame side members 2 are thereby properly spaced to receive main frame end member protrusions 27 which are telescopically received in main frame side members 2 and fixed thereto by eye pins 21 and retainer clips 22. The vertical frames 25, one on each side of the gate, are now slid onto protrusions 15 and supported by vertical frame supports 20 which are slid into frame support bushing 26 and held by retainer clips 22. The platform grates 1 are now placed on the ground in the space within the boundaries of the main frame 24. The outer corners of the platform grates 1 are now attached to the main frame 24 by chains 10 and at their inner corners by chains 7 to lifting spring 6 which is in turn connected to lifting lever 9 which is then pivoted upwardly and held by retainer 5. When both lifting levers 9 are pivoted, it raises the central area of the gate inclining each grate 1 from ground level at the entrance and exit to a considerable height in the central area. The gate is now ready for use. A vehicle whether it be a large truck, small truck, car, snowmobile etc. may easily pass through the opening but be a deterrent to livestock passage. The platform grates 1 can be folded up for a positive barrier or snow removal or they can, in the folded position, serve as a swing gate. No pit is necessary to give depth perception to the livestock to prevent their passage.

What I claim is:

1. A portable livestock gate comprising in combination, a rectangular tubular main frame having two sides and two ends to be placed on a basically horizontal surface, an upright tubular ladder frame mounted on each side of said rectangular main frame near a central portion thereof and perpendicular thereto, truss supports extending between each said ladder frame and one of the two sides on which it is mounted, two platform grates located within the boundary of said main frame, each said platform grate being tethered to said main frame at two spaced locations, lever means pivotally mounted on each of said ladder frames, a lifting spring tethered by an adjustable length lifting spring upper chain to said lever means and an adjustable length lifting spring lower chain tethered to each of said platform grates whereby a pivoting of both said lever means raises each platform grate in a central area of said gate thereby providing a ground level approach from both said ends yet providing a livestock passage barrier in said raised central area.

2. A portable livestock gate as claimed in claim 1 wherein each of the platform grates include two grate side members separated by several grate cross members.

3. A portable livestock gate as claimed in claim 2 wherein said platform grates are tethered in said main frame near said main frame ends by a length of chain.

4. A portable livestock gate as claimed in claim 3 wherein said several grate cross members are made of square tubing whose sides are at a 45° angle to the plane of said platform grates.

5. A portable livestock gate as claimed in claim 4 wherein each said ladder frame includes two ladder frame uprights separated by several ladder frame cross supports.

6. A portable livestock gate as claimed in claim 5 wherein each said ladder frame includes a platform grate securing rod, whereby said main frame to platform grate tether when free of said main frame can retain each platform grate in a vertical positive barrier position when engaging said platform grate securing rod.

7. A portable livestock gate as claimed in claim 5 wherein said main frame further includes a protrusion to be received by one of said ladder frame cross supports and wherein said main frame further includes a protrusion to be received by a main frame cross member.

8. A portable livestock passage barrier comprising in combination, a horizontal main frame means including two main frame side members connected to two main frame end members and a main frame cross member, said main frame side members having a first protrusion to be received by said main frame cross member, a vertical frame means mounted on said main frame means, platform grate means including two or more platform grates fastened to said main frame means such that each said platform grate can pivot thereabout, adjustable pivoting means fastened to said vertical frame means and connected to the platform grate means, whereby an adjusted pivoting of the platform grate means can provide in a central area of said passage a raised livestock barrier yet permit passage of a vehicle.

9. A portable livestock passage barrier comprising in combination, a horizontal main frame means, a vertical frame means mounted on said main frame means, platform grate means including two or more platform grates fastened to said main frame means such that each said platform grate can pivot thereabout, each said platform grate of said platform grate means includes two platform grate side members spaced and united by square tubular platform grate cross members whose sides are at a 45° angle to the plane of said platform grates, adjustable pivoting means fastened to said vertical frame means and connected to the platform grate means whereby an adjusted pivoting of the platform grate means can provide in a central area of said passage a raised livestock barrier yet permit passage of a vehicle.

10. A portable livestock passage barrier comprising in combination, a horizontal main frame means, a vertical frame means mounted on said main frame means, platform grate means including two or more platform grates fastened to said main frame means such that each platform grate can pivot thereabout, adjustable pivoting means fastened to said vertical frame means and connected to the platform grate means, said adjustable pivoting means including spring biasing means tethered to a pivotable handle which is fastened to said vertical frame means and wherein said spring biasing means is connected by tethering to the platform grate means.

11. A portable livestock passage barrier as claimed in claim 8 wherein said main frame side members have a second protrusion to be received by said vertical frame means.

12. In a portable livestock passage barrier for permitting passage of a ground traversing vehicle but providing a deterrent for livestock passage, a frame means including a main frame means and a vertical frame means attached thereto, a grate means tiltably and releasably connected to said frame means, said grate means including at least one platform grate having two platform grate side members spaced and connected by several platform grate cross members, tilting means connected to said frame means and to said grate means, said tilting means including a platform grate biasing means tethered to said grate means and a lever connected to said vertical frame means and tethered to said biasing means whereby operation of said tilting means can elevate a central portion of said passage barrier while leaving an entrance portion and an exit portion of said passage barrier at ground level thereby permitting passage of said vehicle but preventing passage of the livestock.

13. In a portable livestock passage barrier as claimed in claim 12 wherein said biasing means is a spring and said tethering to said grate means and said tethering to said biasing means are adjustable chains.

14. In a portable livestock passage barrier for permitting passage of a ground traversing vehicle but providing a deterrent for livestock passage, a frame means including a main frame means and a vertical frame means attached thereto, a grate means tiltably and releasably connected to said frame means, said grate means including at least one platform grate having two platform grate side members spaced and connected by several platform grate cross members, tilting means connected to said frame means and to said grate means, said tilting means including a platform grate biasing means adjustably tethered to said grate means, whereby operation of said tilting means can elevate a central portion of said passage barrier while leaving an entrance portion and an exit portion of said passage barrier at ground level thereby permitting passage of said vehicle but preventing passage of said livestock.

* * * * *